(12) United States Patent  
Miyazawa

(10) Patent No.: US 7,304,686 B2
(45) Date of Patent: Dec. 4, 2007

(54) ON-SCREEN DISPLAY SIGNAL PROCESSING DEVICE

(75) Inventor: Hirotoshi Miyazawa, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 548 days.

(21) Appl. No.: 11/048,917

(22) Filed: Feb. 3, 2005

(65) Prior Publication Data

US 2005/0264699 A1 Dec. 1, 2005

(30) Foreign Application Priority Data

May 28, 2004 (JP) ............................... 2004-159719

(51) Int. Cl.
*H04N 5/445* (2006.01)

(52) U.S. Cl. ..................................... 348/569

(58) Field of Classification Search ................ 348/569, 348/564, 563, 566, 558, 589, 598, 600
See application file for complete search history.

(56) References Cited

U.S. PATENT DOCUMENTS 5,920,355 A * 7/1999 Kim ............................ 348/569

6,556,254 B1 * 4/2003 Palmero ..................... 348/678
7,010,220 B2 * 3/2006 Ando et al. ................. 386/125
7,167,210 B2 * 1/2007 Seo et al. .................... 348/569
7,215,877 B2 * 5/2007 Ando et al. ................. 386/125

FOREIGN PATENT DOCUMENTS

JP 10-31454 2/1998
JP 2001-343964 12/2001

* cited by examiner

*Primary Examiner*—Paulos Natnael
(74) *Attorney, Agent, or Firm*—Pillsbury Winthrop Shaw Pittman, LLP

(57) ABSTRACT

An on-screen display (OSD) signal generating circuit which provides an analog output is utilized for realizing on-screen display of a digital display device and providing stable operations and signals. An OSD signal processing device has an OSD signal generating circuit which outputs an analog OSD signal in the form of a current and a resistor which has its one end connected to the output terminal of the OSD signal generating circuit and its other end connected to ground to convert a current signal into a voltage signal. In an analog-to-digital converter the input terminal of which is connected to the output terminal of the OSD signal generating circuit, the sampling upper- and lower-limiting voltages of a signal applied to the input terminal are defined by a power source voltage and ground potential, respectively.

10 Claims, 7 Drawing Sheets

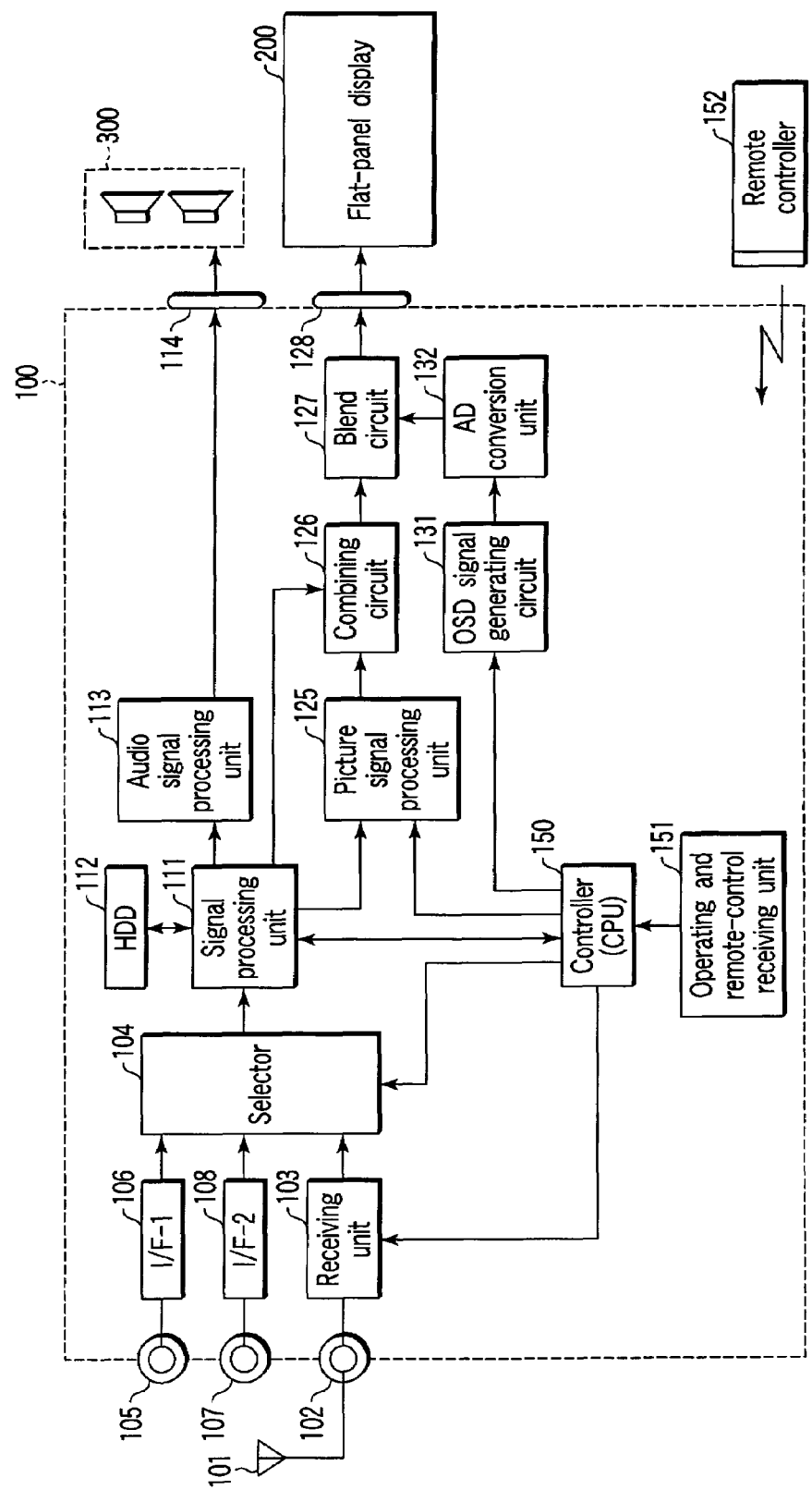
F I G. 1

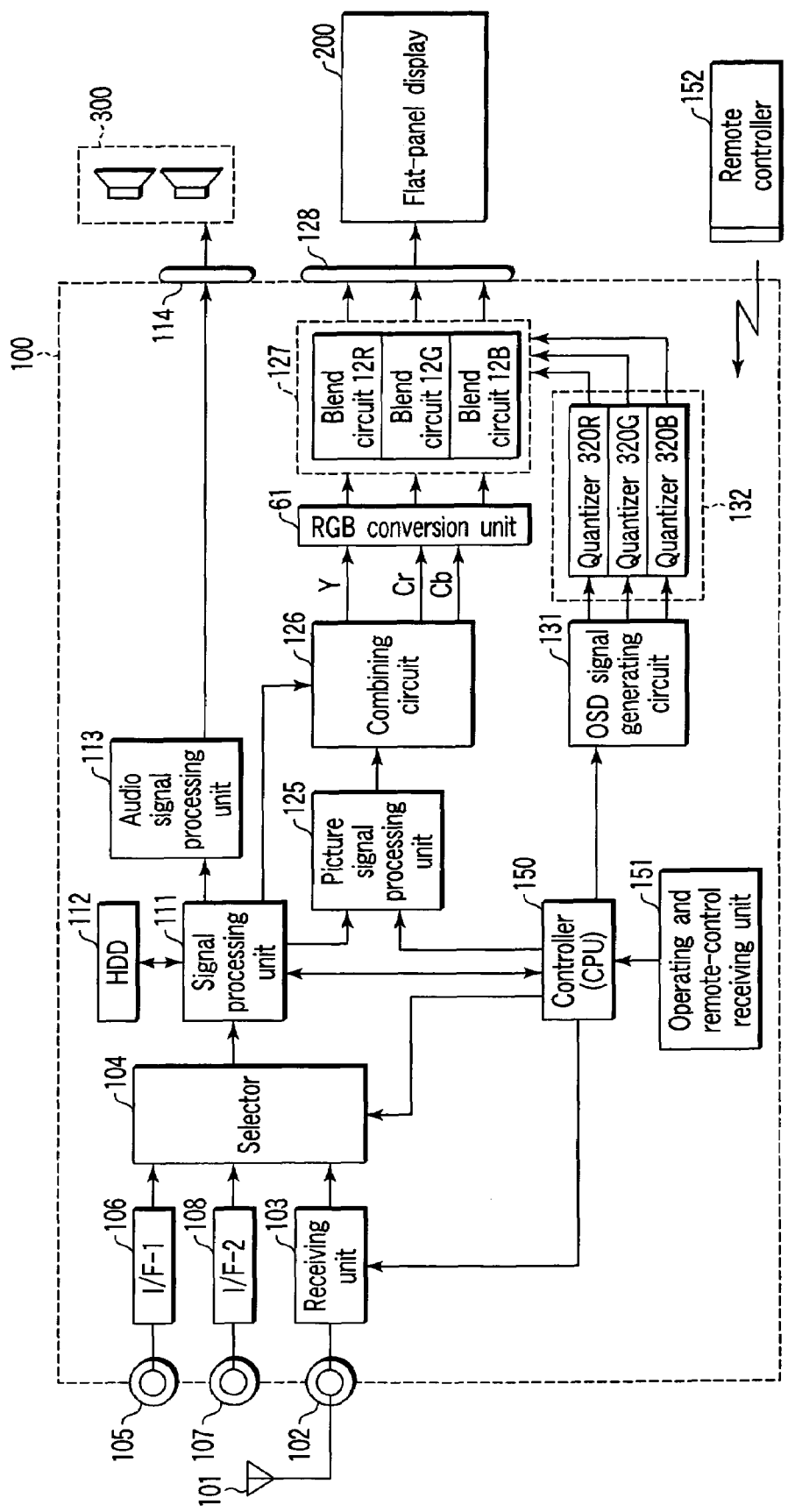
F I G. 3

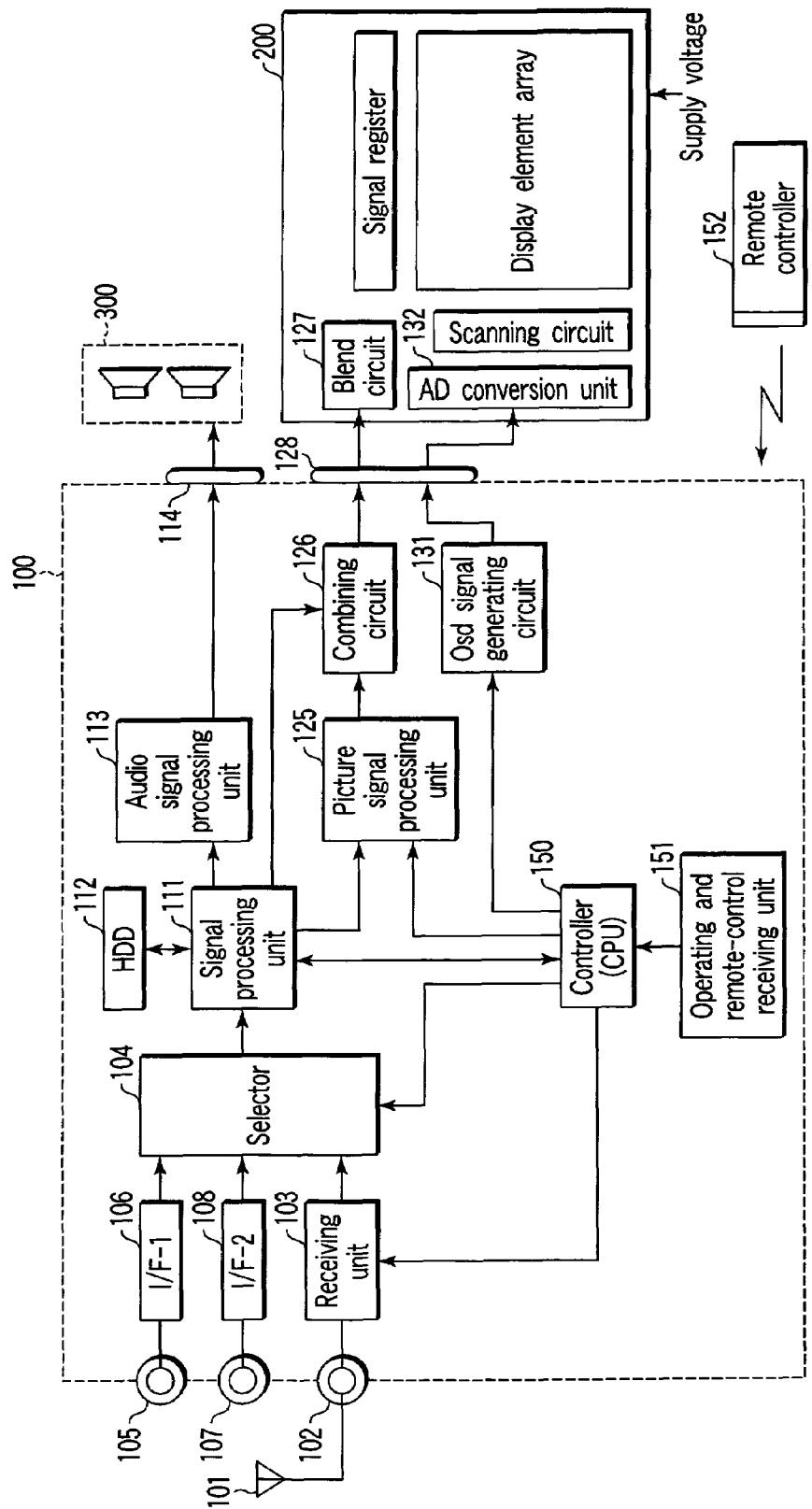
F I G. 5

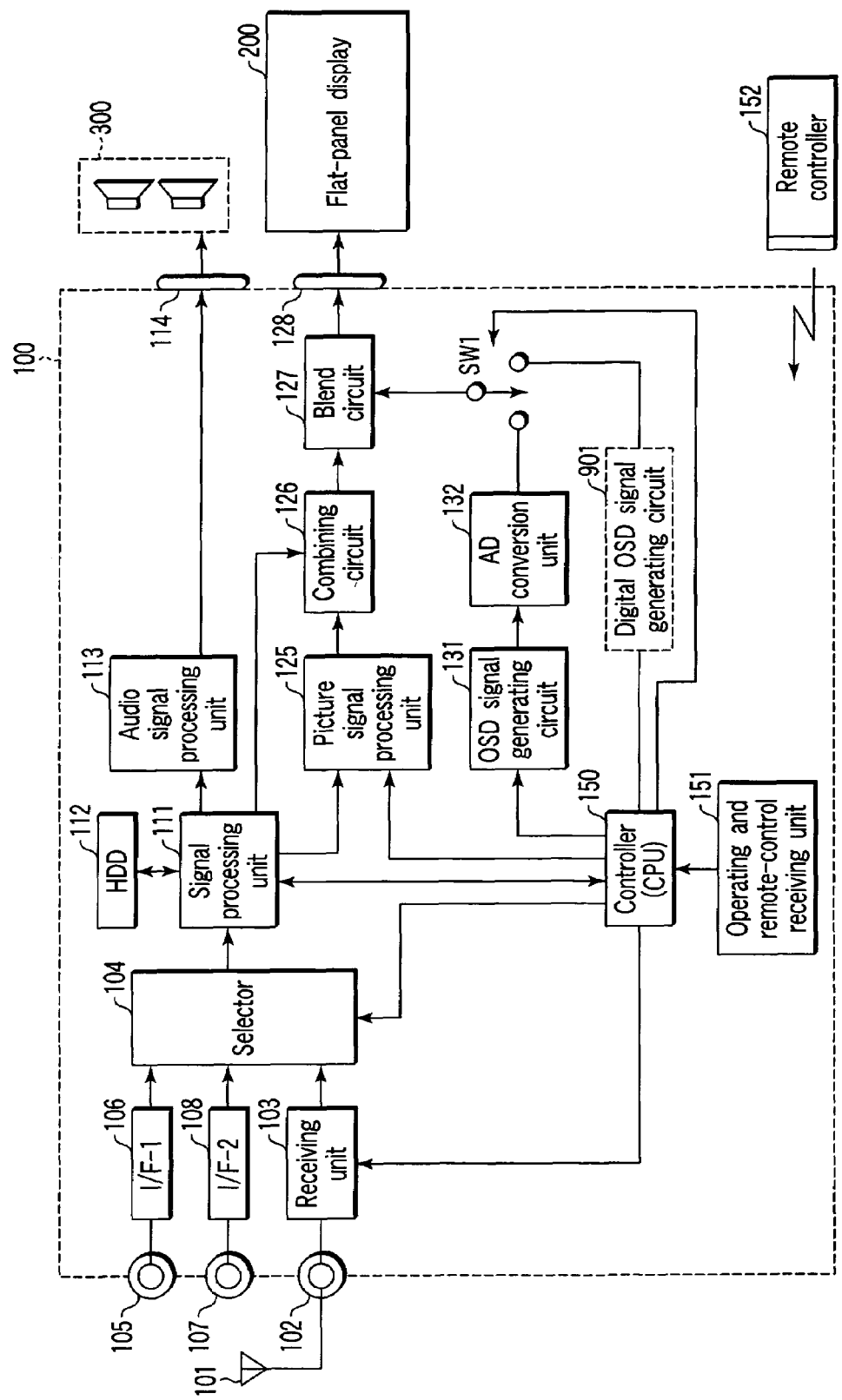
F I G. 6

US 7,304,686 B2

ON-SCREEN DISPLAY SIGNAL PROCESSING DEVICE

CROSS-REFERENCE TO RELATED APPLICATIONS

This application is based upon and claims the benefit of priority from prior Japanese Patent Application No. 2004-159719, filed May 28, 2004, the entire contents of which are incorporated herein by reference.

BACKGROUND OF THE INVENTION

1. Field of the Invention

The present invention relates to an on-screen display signal processing device which is adapted for use with television sets employing digital display devices, such as liquid crystal panels, plasma display panels (PDPs), etc.

2. Description of the Related Art

Television sets are provided with an on-screen display (OSD) signal processing circuit. The OSD signal processing device has a memory previously stored with given characters and graphic data which are displayed at mode and channel switching times. With analog television sets, the characters and graphic data are converted into digital form and then applied to a picture signal combining circuit.

In recent years, television sets containing digital flat-panel display devices, such as liquid crystal panels, plasma display panels (PDPs), etc., have become widespread. In the case of these television sets, in order to obtain OSD signals to be applied to the flat-panel display devices, original OSD signal processing devices have been developed. See, for example, Japanese Unexamined Patent Publications Nos. 10-031454 and 2001-343964.

In future, principal television sets will be those containing digital display devices, such as liquid crystal panels, plasma display panels, etc. The development of a new original OSD signal processing circuit adapted for digital processing under such a circumstance would result in a considerable increase in the cost of the television sets. In addition, conventional OSD signal processing circuits adapted to provide analog outputs would fall into disuse, leading to a waste of resources.

Up to now, various OSD signal generating circuits have been developed and manufactured. OSD signals include channel number display signals and menu display signals. Remanufacturing these circuits into circuits adapted for the digital television sets would involve considerable cost and time.

BRIEF SUMMARY OF THE INVENTION

It is an object of the present invention to provide an on-screen display signal processing device which utilizes an OSD signal generating circuit adapted to provide analog outputs to realize on-screen display on a digital display device and achieves the stability of operations and signals.

To achieve the object, an embodiment of the invention comprises: an OSD signal generating circuit which outputs an on-screen display (OSD) signal in the form of an analog current signal; a resistor which has its one end connected to the output terminal of the OSD signal generating circuit and its other end connected to ground; and an analog-to-digital conversion unit which has its input terminal connected to the output terminal of the OSD signal generating circuit and in which the sampling upper- and lower-limiting voltages of a voltage signal applied to the input terminal are defined by a power source voltage and ground potential, respectively.

According to the above arrangement, the lower-limiting potential of the OSD signal generating circuit and the sampling lower-limiting potential of the analog-to-digital conversion unit coincide with each other; therefore, the output terminal of the OSD signal generating circuit and the input terminal of the analog-to-digital conversion unit can be directly coupled to each other. For this reason, there is no need of placing such an element as causes variations, for example, a coupling capacitor, between the OSD signal generating circuit and the analog-to-digital conversion unit. Therefore, the operation can be made stable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of an embodiment of the present invention;

FIG. 3 is a block diagram of another embodiment of the present invention;

FIG. 5 is a block diagram of another embodiment of the present invention;

FIG. 6 is a block diagram of a further embodiment of the present invention; and

DETAILED DESCRIPTION OF THE INVENTION

Figure 2:
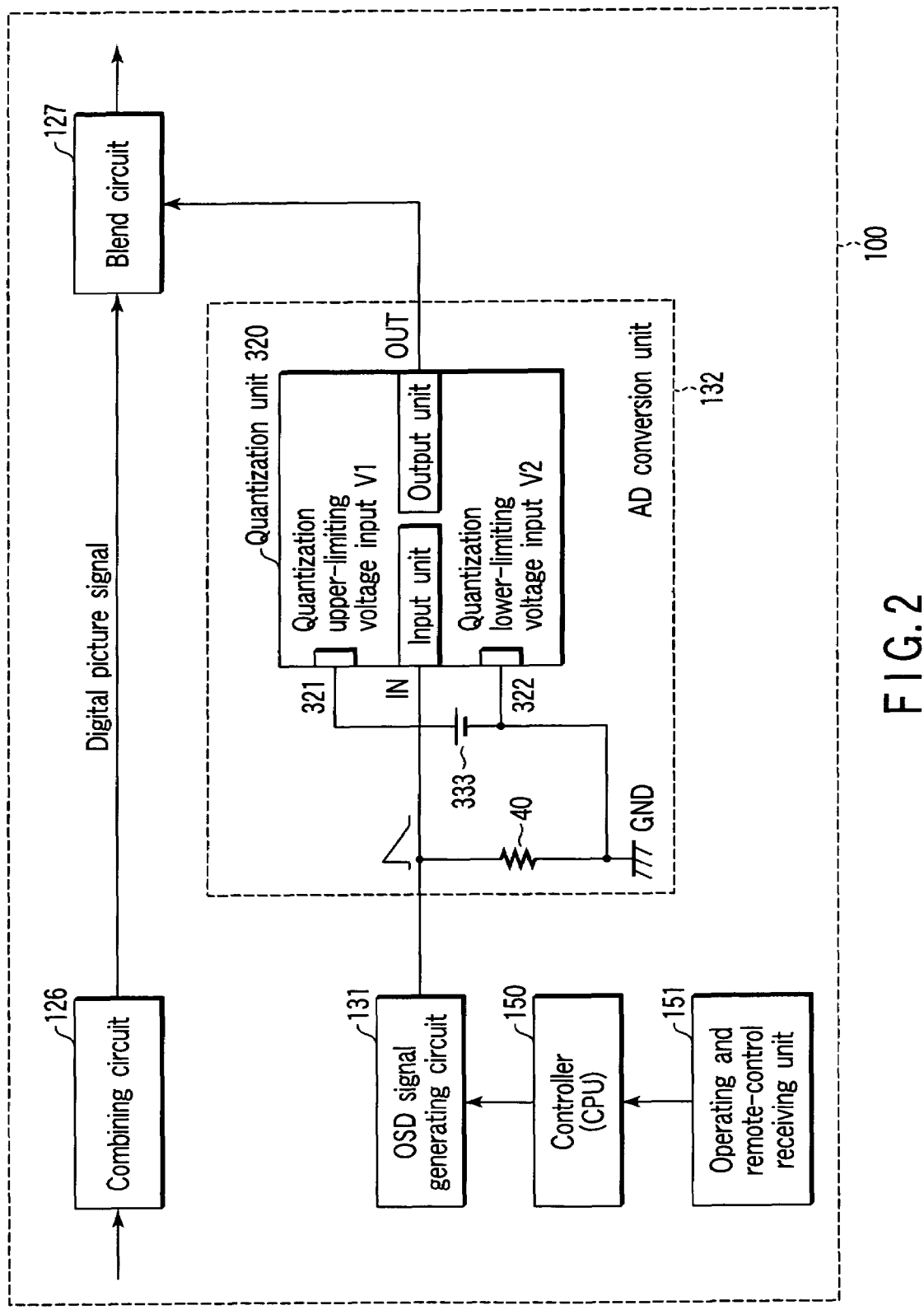
FIG. 2 illustrates a part of the arrangement of FIG. 1 in more detail.

The embodiments of the present invention will be described hereinafter with reference to the accompanying drawings.

In FIG. 1 there is shown a schematic block diagram of a television receiver, indicated by 100, to which the invention is applied. Received signals from an antenna 101 are conducted through a terminal 102 to a receiving unit 103. A signal selected in the receiving unit 103 is input through a selector 104 to a signal processing unit 111. Processes performed by the signal processing unit include extraction of packets from a stream, and separation and decoding of the packets. When the television receiver is equipped with a hard disk drive 112, disk formatting will also be involved.

The selector 104 can also select an external signal input through a terminal 106 and an interface 106. Further, the selector 104 can select an external signal input through a terminal 107 and an interface 108. The terminals 105 and 107 are connected to an external line input and video playback apparatus (for example, a digital video disk player, video tape recorder, etc.). Further, a digital picture signal may be received from another digital tuner or a personal computer.

An audio signal separated by the signal processing unit 111 is conducted to an audio signal processing unit 113 which provides amplification, digital-to-analog (DA) conversion, etc. and then delivered to an output terminal 114 to which a speaker system 300 is connected.

A picture signal from the signal processing unit 111 is conducted to a picture signal processing unit 125 which provides decode processing, brightness and color signal processing, etc. The picture signal output from the picture signal processing unit 125 is applied through a combining circuit 126 to a blend circuit 127. In the combining circuit 126, the picture signal is combined with a sub-picture signal or a text data signal from the signal processing unit 111.

The blend circuit 127 can combine an on-screen display (OSD) signal to be described later with the digital picture signal output from the combining circuit 126. The OSD signal is produced in analog form by an OSD signal generating circuit 131 and then converted into digital form by an analog-to-digital (AD) converter 132. The resulting digital OSD signal is input to the blend circuit 127. The digital picture signal output from the blend circuit 127 is applied through an output terminal 128 to a flat-panel display 200.

A controller 150 outputs control signals to determine the contents of data to be read from the OSD signal generating circuit 131. The controller 150 is supplied with an operation signal from an operating unit and remote-control receiver 151, which is adapted to output that operation signal in response to a transmit signal from a remote controller 152.

At the time power to the television receiver is turned on, the controller 150 upon receipt of an operation signal designates read addresses of the OSD signal generating circuit 131 so that display signals for displaying the number of a channel that is first received, the volume state, and so on are output. In addition, the controller 150 produces control signals for the receiving unit 103, the selector 104, the signal processing unit 111, the picture signal processing unit 125, and others. At the time of selecting a program, the controller 150 controls the channel and program selected states of the receiving unit 103. Controlled by the controller 150, the picture signal processing unit 125 performs picture quality control and the audio signal processing unit 113 performs volume control. Further, the controller controls the selector 104 to make a selection from external signals. To conform to such various operations, the OSD signal generating circuit 131 provides guide OSD display signals so as to allow the user to easily recognize the operating states on the screen.

The blend circuit 127, the AD conversion unit 132, the OSD signal generating circuit 111 and the controller 150 will be described hereinafter in further detail.

In FIG. 2, the digital picture signal output from the combining circuit 126 is input to the blend circuit 127, which is arranged as shown in, for example, the literature 1 to combine an OSD signal and the input digital picture signal.

The picture signal output from the blend circuit is applied through the terminal 128 to the flat-panel display 200 and displayed on it. The flat-panel display 200 is a digital display unit, such as a liquid crystal panel, a plasma display panel (PDP), or the like.

The OSD (On-Screen Display) signal generating circuit 131 provides an analog OSD signal which is a current signal. The analog OSD signal is converted into a voltage signal, which is in turn applied directly to an input of a quantization unit 320. That is, a resistor 40 acting as a current-to-voltage conversion element is connected between the output terminal of the OSD signal generating circuit 131 and ground. The OSD signal output in the form of current is converted to a voltage by the resistor 40.

The quantization lower-limiting voltage (V2) input 322 of the quantization unit 320 is connected to ground potential to which the ground side of the resistor 40 is connected. The quantization upper-limiting voltage (V1) input 321 of the quantization unit 320 is set at a potential defined by a power source 333.

With such an arrangement, the lower-limiting potential of the OSD signal generating circuit 131 and the sampling lower-limiting potential of the quantization unit 320 coincide with each other, thus allowing the output terminal of the OSD signal generating circuit 131 to be directly coupled to the input of the quantization unit 320. Therefore, there is no need of connecting such an element as causes variations, for example, a coupling capacitor, between both the circuits.

If the lower-limiting potential of the OSD signal generating circuit 131 and the sampling lower-limiting potential of the quantization unit 320 were not coincident with each other, a coupling capacitor to prevent the passage of direct current and a clamping circuit would be needed between the circuits for matching purposes. These coupling circuits would involve variation factors, such as time constants. Changing of component values with time and temperature drift would cause variations in the time constants, disturbing stable operation.

In contrast, the abovementioned circuit allows the output terminal of the OSD signal generating circuit 131 to be directly coupled to the input of the analog-to-digital conversion unit 132. Since the quantization lower-limiting potential is the ground potential, such variation factors as described above can be absorbed. In addition, the quantization upper-limiting potential can be stabilized by the power source voltage.

When the operating and remote-control receiving unit 151 outputs a channel switching signal, for example, the controller 150 supplies the OSD signal generating circuit 131 with a signal to control the timing of outputting an OSD signal (for example, a channel-number picture signal). OSD signals output from the OSD signal generating circuit 131 include picture signals for displaying channel numbers, various characters, figures, bars, and menus. Source data for the OSD signals have been developed uniquely by an individual maker and stored in a memory as picture data. A digital OSD signal, upon reading from the memory, is converted into an analog signal. This process is performed to conform to conventional analog television sets.

However, the analog OSD signal cannot be applied to the blend circuit in recent digital display devices, such as a liquid crystal display panel or a plasma display panel (PDP). To solve such a problem, the on-screen display signal processing device of the invention is arranged as described above to provide a stable operation.

In the first embodiment shown in FIG. 1, only the brightness signal system is illustrated for easier understanding. In practice, the on-screen display signal processing device is arranged as one for use with a color display device.

FIG. 3 illustrates R, G and B signal processing systems. In this diagram, corresponding blocks to those in FIG. 1 are denoted by like reference numerals. That is, in the on-screen display signal processing device adapted for a color display device, an RGB conversion circuit 61 is provided which supplies the blend circuit 127 with a digital red (R) signal, a digital green (G) signal, and a digital blue (B) signal. The R, G and B signals are applied to an R blend circuit 12R, a G blend circuit 12G, and a B blend circuit 12B, respectively, of the blend circuit 127. The resulting R, G and B signals output from the blend circuit 127 are applied to the color flat-panel display 200.

The R blend circuit 12R, the G blend circuit 12G and the B blend circuit 12B are supplied with R, G and B OSD signals, respectively. The R, G and B OSD signals are output from a quantizer 320R, a quantizer 320G, and a quantizer 320B, respectively, in the analog-to-digital conversion unit 132. Each of the quantizers 320R, 320G and 320B is arranged as described above in connection with FIG. 2. The OSD signal generating circuit 131 also provides R, G and B OSD signals (in this example, analog signals).

Although the embodiment has been described as placing the blend circuit 127 outside the flat-panel display 200, the blend circuit may be mounted on a board in the flat-panel display 200.

Figure 4:
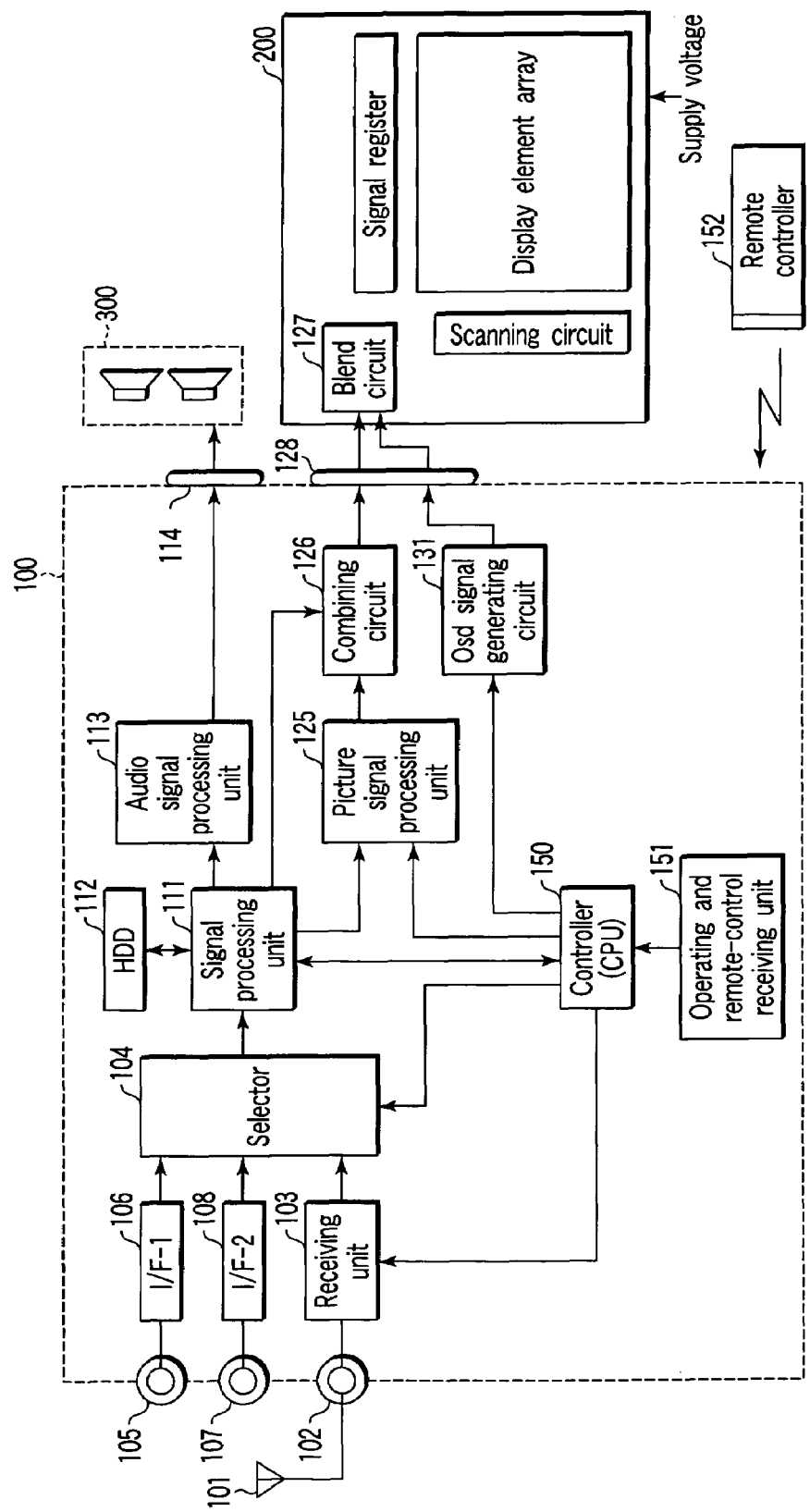
FIG. 4 is a block diagram of a further embodiment of the present invention.

That is, as shown in FIG. 4, the blend circuit 127 is mounted on a board in the flat-panel display 200. Other portions remain unchanged from those in FIG. 1. The flat-panel display is equipped on this board with a display element array, a signal register into which a display signal is fed, and a scanning circuit which determines which pixels on scan lines register signals are to be applied to.

FIG. 5 shows another embodiment of the invention. In this embodiment, the blend circuit 127 and the AD conversion unit 132 are mounted on the board in the flat-panel display 200. Even such an arrangement falls within the scope of the invention.

FIG. 6 shows an embodiment in which a switch SW1 is placed between the AD conversion unit 132 and the blend circuit 127. In addition to the circuits described so far, the board is provided with terminals (not shown) for attaching a digital OSD signal generating circuit 901. OSD signals output from the digital OSD signal generating circuit 901 may be directly applied to the blend circuit 127 because they do not require to be converted into digital signals. The present invention provides for the digital OSD signal generating circuit 901 which is newly installed to create a new version of the device. When the digital OSD signal generating circuit 901 is installed newly, the controller 50 can control the switch SW1 to conduct a signal output from the digital OSD signal generating circuit to the blend circuit 127. When only the digital OSD signal generating circuit 901 is used, the controller 150 controls the switch SW1 to place the digital OSD signal generating circuit 901 and the blend circuit 127 in the connected state. When the analog OSD signal generating circuit 131 is used together with the digital OSD signal generating circuit 901, the switch SW1 is controlled according to the OSD contents to be displayed on the screen. In the event that a failure has occurred in the OSD signal generating circuit 131 or the AD conversion unit 132, it becomes possible to use the digital OSD signal generating circuit 901 with ease.

Figure 7:
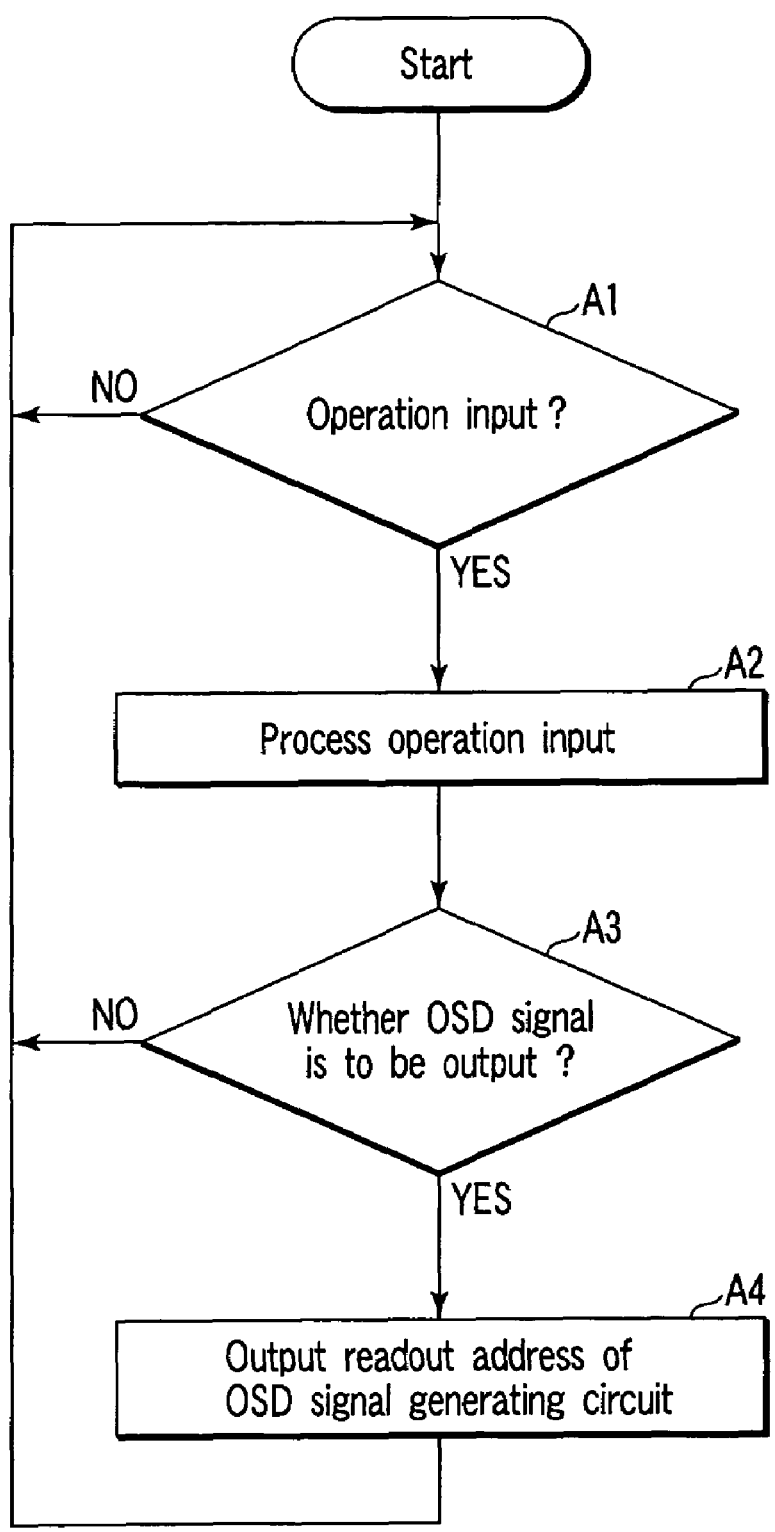
FIG. 7 is a flowchart illustrating an operation of the controller in the embodiments of the present invention.

FIG. 7 is a flowchart for the control of the OSD signal generating circuit 131 by the controller 150. A decision is made as to whether or not some operation has been performed on the remote controller 152 (step A1). If there is an operation input, processing is performed according to its contents (for example, turning on power, channel switching, program selection, input selection, changing of volume, changing of picture quality, changing of aspect ratio, menu selection, etc.) (step A2). At this point, a decision is made as to whether to output an OSD signal or not (A3). If there is a need of outputting an OSD signal, the corresponding readout address of the OSD signal generating circuit 131 is output from a built-in or additional memory (ROM) and then applied to the OSD signal generating circuit (step A4). Thereby, a picture based on the OSD signal is displayed on the display. The readout addresses of the OSD signal generating circuit 131 are stored in the form of a table so that they are mapped into the contents of operations (codes). Here, as the contents of this table, the contents heretofore associated with an OSD signal generating circuit can be utilized as they are.

The invention is not limited to the entirety of the embodiments described above. At the stage of practice of the invention, constituent components can be modified without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An on-screen display signal processing device comprising:

an OSD signal generating circuit outputting an on-screen display (OSD) signal in the form of an analog current signal;

a current-to-voltage conversion element having its one end connected to the output terminal of the OSD signal generating circuit and its other end connected to ground; and a quantization unit having its input terminal connected to the output terminal of the OSD signal generating circuit, and in which the sampling upper- and lower-limiting voltages of a voltage signal applied to the input terminal are defined by a power source voltage and ground potential, respectively.

2. The on-screen display signal processing device according to claim 1, output data of the quantization unit being applied to a blend circuit where it is combined with a digital picture signal.

3. The on-screen display signal processing device according to claim 2, the quantization unit including three quantizers each of which converts a respective one of R (red), G (green) and B (blue) signals and the blend circuit including three blend circuits which correspond to the R, G and B signals, respectively.

4. The on-screen display signal processing device according to claim 3, the output signals of the respective blend circuits being applied to a digital-input color flat-panel display device.

5. The on-screen display signal processing device according to claim 4, the blend circuits being mounted on a board in the flat-panel display device.

6. The on-screen display signal processing device according to claim 2, a switch being placed between the blend circuit and the quantization unit to allow the output of a digital OSD signal generating circuit separate from the OSD signal generating circuit to be selectively coupled to the blend circuit.

7. A television receiver having a blend circuit which combines an on-screen display signal with a digital picture signal, comprising:

an OSD signal generating circuit outputting an on-screen display (OSD) signal in the form of an analog current signal;

a current-to-voltage conversion element having its one end connected to the output terminal of the OSD signal generating circuit and its other end connected to ground; and a quantization unit having its input terminal connected to the output terminal of the OSD signal generating circuit and in which the sampling upper- and lower-limiting voltages of a voltage signal applied to the input terminal are defined by a power source voltage and ground potential, respectively.

8. The television receiver according to claim 7, in which a switch being placed between the blend circuit and the quantization unit to allow the output of a digital OSD signal generating circuit separate from the OSD signal generating circuit to be selectively coupled to the blend circuit.

9. A television signal processing apparatus having a blend circuit which combines an on-screen display signal with a digital picture signal, comprising:

means for outputting an on-screen display (OSD) signal in the form of an analog current signal;

means for converting current to voltage, which connected its one end to the output terminal of the OSD signal and its other end to ground; and means for processing the OSD signal quantization, which its input terminal receives the OSD signal and in which the sampling upper- and lower-limiting voltages of a voltage signal applied to the input terminal are defined by a power source voltage and ground potential, respectively.

10. A television signal processing apparatus according to claim 9, further provided a digital OSD signal generating means which output is selectively input to the blend circuit.

* * * * *